US012068545B2

(12) United States Patent
Lin et al.

(10) Patent No.: US 12,068,545 B2
(45) Date of Patent: Aug. 20, 2024

(54) ANTENNA STRUCTURE

(71) Applicant: HTC Corporation, Taoyuan (TW)

(72) Inventors: Cheng-Hung Lin, Taoyuan (TW); Szu-Po Wang, Taoyuan (TW); Chia-Te Chien, Taoyuan (TW); Chun-Chieh Wang, Taoyuan (TW); Kang-Ling Li, Taoyuan (TW); Chun-Hsien Lee, Taoyuan (TW); Yu-Chieh Chiu, Taoyuan (TW)

(73) Assignee: HTC Corporation, Taoyuan (TW)

(*) Notice: Subject to any disclaimer, the term of this patent is extended or adjusted under 35 U.S.C. 154(b) by 0 days.

(21) Appl. No.: 18/451,849

(22) Filed: Aug. 18, 2023

(65) Prior Publication Data

US 2023/0395976 A1 Dec. 7, 2023

Related U.S. Application Data

(62) Division of application No. 17/700,511, filed on Mar. 22, 2022, now Pat. No. 11,777,212.

(60) Provisional application No. 63/243,207, filed on Sep. 13, 2021.

(51) Int. Cl.
*H01Q 5/371* (2015.01)
*H01Q 1/42* (2006.01)
*H01Q 5/40* (2015.01)

(52) U.S. Cl.
CPC ............... *H01Q 5/371* (2015.01); *H01Q 1/42* (2013.01); *H01Q 5/40* (2015.01)

(58) Field of Classification Search
CPC ............ H01Q 5/10; H01Q 5/30; H01Q 5/335; H01Q 5/35; H01Q 5/371; H01Q 5/40; H01Q 5/50; H01Q 1/36
See application file for complete search history.

(56) References Cited

U.S. PATENT DOCUMENTS

| | | | | |
|---|---|---|---|---|
| 8,717,248 B2* | 5/2014 | Tung | H03H 7/40 | 333/32 |
| 9,590,703 B2* | 3/2017 | Desclos | H04B 7/0871 | |
| 10,547,335 B2* | 1/2020 | Desclos | H04B 1/18 | |
| 11,777,212 B2* | 10/2023 | Lin | H01Q 5/40 | 343/702 |
| 2008/0231526 A1* | 9/2008 | Sato | H01Q 7/00 | 343/722 |
| 2011/0249760 A1* | 10/2011 | Chrisikos | H01Q 1/243 | 455/67.11 |
| 2013/0063223 A1* | 3/2013 | See | H03F 1/56 | 333/32 |

(Continued)

*Primary Examiner* — Jason M Crawford
(74) *Attorney, Agent, or Firm* — JCIPRNET

(57) ABSTRACT

An antenna structure includes a first signal source, a second signal source, a first radiator, a second radiator, a third radiator, a first circuit, and a second circuit. The first signal source is used to generate a first wireless signal, and the second signal source is used to generate a second wireless signal. The first radiator is coupled to the first signal source to receive the first wireless signal, and the second radiator is coupled to the second signal source to receive the second wireless signal. The first circuit has a first end coupled to the third radiator and a second end coupled to the first radiator or the first signal source. The second circuit has a first end coupled to the third radiator and a second end coupled to the second radiator or the second signal source.

6 Claims, 6 Drawing Sheets

(56) References Cited

U.S. PATENT DOCUMENTS

| | | | | |
|---|---|---|---|---|
| 2013/0278477 | A1* | 10/2013 | Dupuy | H01Q 1/50<br>343/852 |
| 2014/0295775 | A1* | 10/2014 | Rousu | H04L 5/001<br>455/73 |
| 2015/0340769 | A1* | 11/2015 | Desclos | H01Q 21/30<br>343/745 |
| 2019/0260460 | A1* | 8/2019 | Ashworth | H04B 1/18 |
| 2019/0372215 | A1* | 12/2019 | Lee | H01Q 5/378 |
| 2023/0081739 | A1* | 3/2023 | Lin | H01Q 21/28<br>343/702 |
| 2023/0395976 | A1* | 12/2023 | Lin | H01Q 21/28 |

* cited by examiner

ANTENNA STRUCTURE

CROSS-REFERENCE TO RELATED APPLICATION

This application is a divisional application of and claims the priority benefit of a prior application Ser. No. 17/700,511, filed on Mar. 22, 2022, which claims the priority benefit of U.S. provisional application Ser. No. 63/243,207, filed on Sep. 13, 2021. The entirety of each of the above-mentioned patent applications is hereby incorporated by reference herein and made a part of this specification.

BACKGROUND

Technical Field

The disclosure relates to an antenna structure, and in particular to an antenna structure that supports Wireless Wide Area Network (WWAN) and Wireless Local Area Network (WLAN).

Description of Related Art

With the vigorous development of the wireless communication industry, people's demand for wireless data transmission is increasing day by day, and 5th generation mobile networks (5G) is born accordingly. 5G technology has been widely used in applications such as WWAN and WLAN.

5G technology adopts the key technology of Multi-input Multi-output (MIMO), but the isolation and radiation pattern design of MIMO antenna may affect the wireless transmission capacity and communication quality of electronic devices.

SUMMARY

The present invention provides an antenna structure that can adjust the antenna pattern and/or increase the isolation to achieve the best communication quality.

The antenna structure includes a first signal source, a second signal source, a first radiator, a second radiator, a third radiator, a first circuit, and a second circuit. The first signal source is used to generate a first wireless signal, and the second signal source is used to generate a second wireless signal. The first radiator is coupled to the first signal source to receive the first wireless signal, and the second radiator is coupled to the second signal source to receive the second wireless signal. The first circuit has a first end coupled to the third radiator and a second end coupled to the first radiator or the first signal source. The second circuit has a first end coupled to the third radiator and a second end coupled to the second radiator or the second signal source.

In one embodiment of the present invention, wherein when the second end of the first circuit is coupled to the first radiator, the first circuit turns on or off the connection path between the third radiator and the first radiator according to the mode selecting signal.

In one embodiment of the present invention, wherein when the second end of the first circuit is coupled to the first signal source, the first circuit turns on or off the connection path between the third radiator and the first signal source according to the mode selecting signal.

Based on the above, the antenna structure of the present invention has an additional radiator, which can be turned on or off according to the connection path between the additional radiator and the signal source or another radiator. Thereby, the radiation pattern of the antenna can be adjusted and/or the isolation of the antenna can be increased to achieve the best communication quality.

DESCRIPTION OF THE EMBODIMENTS

Figure 1:
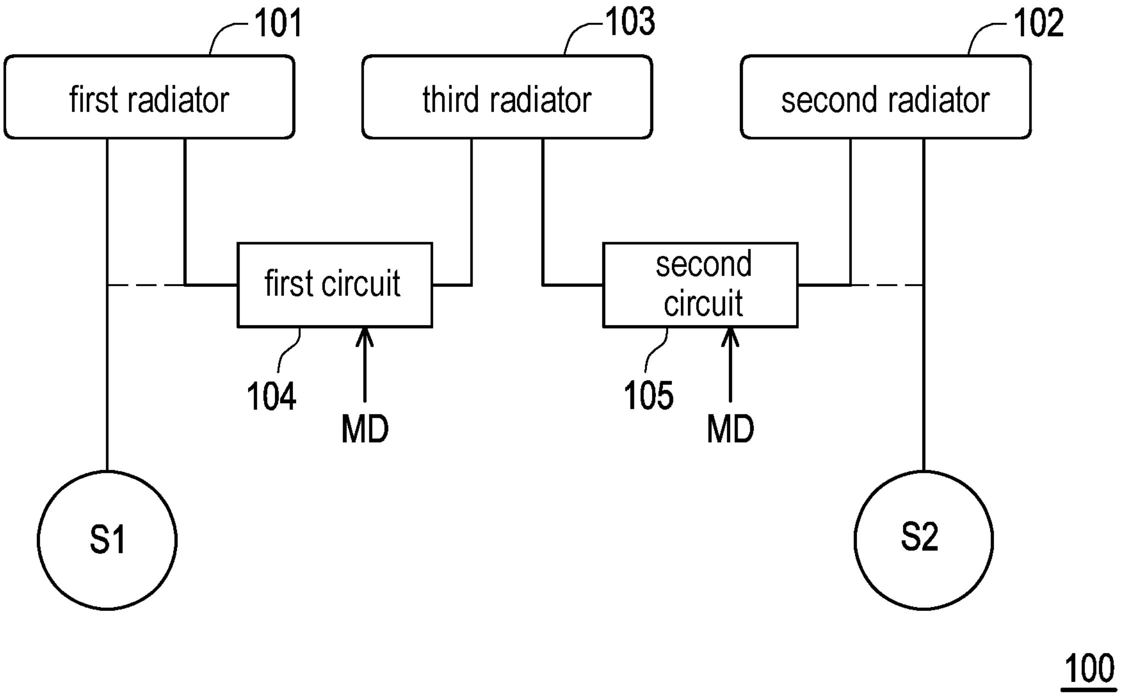
FIG. 1 is a schematic diagram of an antenna structure according to an embodiment of the present invention.

Referring to FIG. 1, FIG. 1 is a schematic diagram of an antenna structure according to an embodiment of the present invention. The antenna structure 100 includes a first signal source S1, a second signal source S2, a first radiator 101, a second radiator 102, a third radiator 103, a first circuit 104, and a second circuit 105. The first signal source S1 is used to generate a first wireless signal, and the second signal source S2 is used to generate a second wireless signal. The first radiator 101 is coupled to the first signal source S1 to receive the first wireless signal, and the second radiator 102 is coupled to the second signal source S2 to receive the second wireless signal. The first circuit 104 has a first end coupled to the third radiator 103. The second circuit 105 has a first end coupled to the third radiator 103. A second end of the first circuit 104 may be coupled to the first radiator 101 or the first signal source S1. A second end of the second circuit 105 may be coupled to the second radiator 102 or the second signal source S2.

In the embodiment, when the second end of the first circuit 104 is coupled to the first radiator 101, the second end of the second circuit 105 may be coupled to the second radiator 102. When the second terminal of the first circuit 104 is coupled to the first signal source S1, the second terminal of the second circuit 105 may be coupled to the second signal source S2.

The first circuit 104 and the second circuit 105 of the present invention each have a switching function, and also have functions such as impedance matching and/or filtering. When the second end of the first circuit 104 is coupled to the first radiator 101, the first circuit 104 can turn on or off the connection between the first radiator 101 and the third radiator 103 through the switch function. Conversely, when the second end of the second circuit 105 is coupled to the second radiator 102, the second circuit 105 can turn on or off the connection between the second radiator 102 and the third radiator 103 through the switch function. On the other hand, when the second end of the first circuit 104 is coupled to the first signal source S1, the first circuit 104 can turn on or off the connection between the first signal source S1 and the third radiator 103 through the switch function. Conversely, when the second end of the second circuit 105 is coupled to the second signal source S2, the second circuit 105 can turn on or off the connection between the second signal source S2 and the third radiator 103 through the switch function. The first circuit 104 and the second circuit 105 described above can perform switching operations according to the mode selecting signal MD, so that the antenna structure 100 can operate in different modes.

Wherein, the first radiator to the third radiator 101~103 may be constituted by conductor structures, so that the current distribution on the conductor structures can be excited to generate radiation signals by changing with time. The conductor structures constituting the first to third radiators 101~103 can be implemented using antenna structure designs known to those skilled in the art, and there is no fixed limitation. In some embodiments, the first to third radiators 101~103 may be part of a metal casing of an electronic device.

In some embodiments, the first to third radiators 101~103 are not coupled to the reference ground terminal of the electronic device. In some embodiments, the first radiator to the third radiator 101~103 may each have one end coupled to the reference ground terminal of the electronic device provided in the antenna structure 100. In some embodiments, only one end of the third radiator 103 is coupled to the reference ground terminal of the electronic device. And in some specific embodiments, the third radiator 103 can also be formed by an extension structure of the main ground plane of the electronic device.

Wherein, the first signal source S1 and the second signal source S2 may be constituted by a circuit, or may be a transmission end (Tx) of an electronic device set in the antenna structure 100. It can also be the Tx end of an external device, or any conventional form of signal source, for providing a signal so that the radiator is excited to generate a radiation signal.

Figure 2:
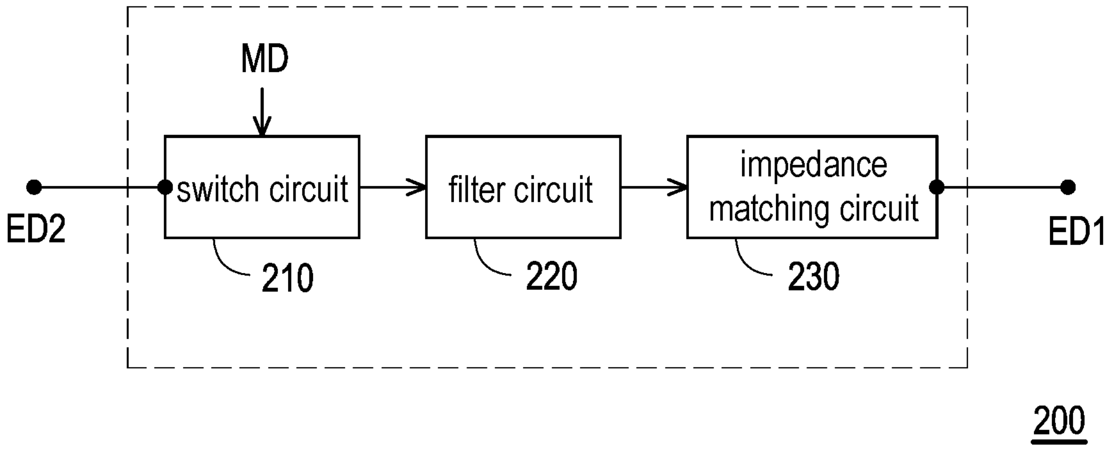
FIG. 2 is a schematic diagram of a first circuit according to an embodiment of the present invention.

Referring to FIG. 2 and FIG. 1, FIG. 2 is a schematic diagram of a first circuit and a second circuit according to an embodiment of the present invention in FIG. 1. Wherein, the first circuit 104 and the second circuit 105 in the embodiment of FIG. 1 may have the same circuit structure. As shown in the circuit 200 in FIG. 2, the circuit 200 includes a switch circuit 210, a filter circuit 220 and an impedance matching circuit 230. The switch circuit 210, the filter circuit 220 and the impedance matching circuit 230 are coupled to each other in series. The circuit 200 may have a first end ED1 and a second end ED2. Wherein, the connection sequence of the switch circuit 210, the filter circuit 220 and the impedance matching circuit 230 is not limited, and FIG. 2 is only an example for illustration, and is not intended to limit the scope of the present invention.

In FIG. 2, the switch circuit 210 is used for turning on or off the connection between the first end ED1 and the second end ED2 of the circuit 200 according to the mode selecting signal MD. The filter circuit 220 is used for filtering the received signal when the switch circuit 210 is turned on. The impedance matching circuit 230 is used to match the impedances between the two connected circuits when the switch circuit 210 is turned on.

Wherein, the hardware structures of the switch circuit 210, the filter circuit 220 and the impedance matching circuit 230 can all be implemented using circuit structures known to those skilled in the art, and there is no fixed limitation.

Figure 3:
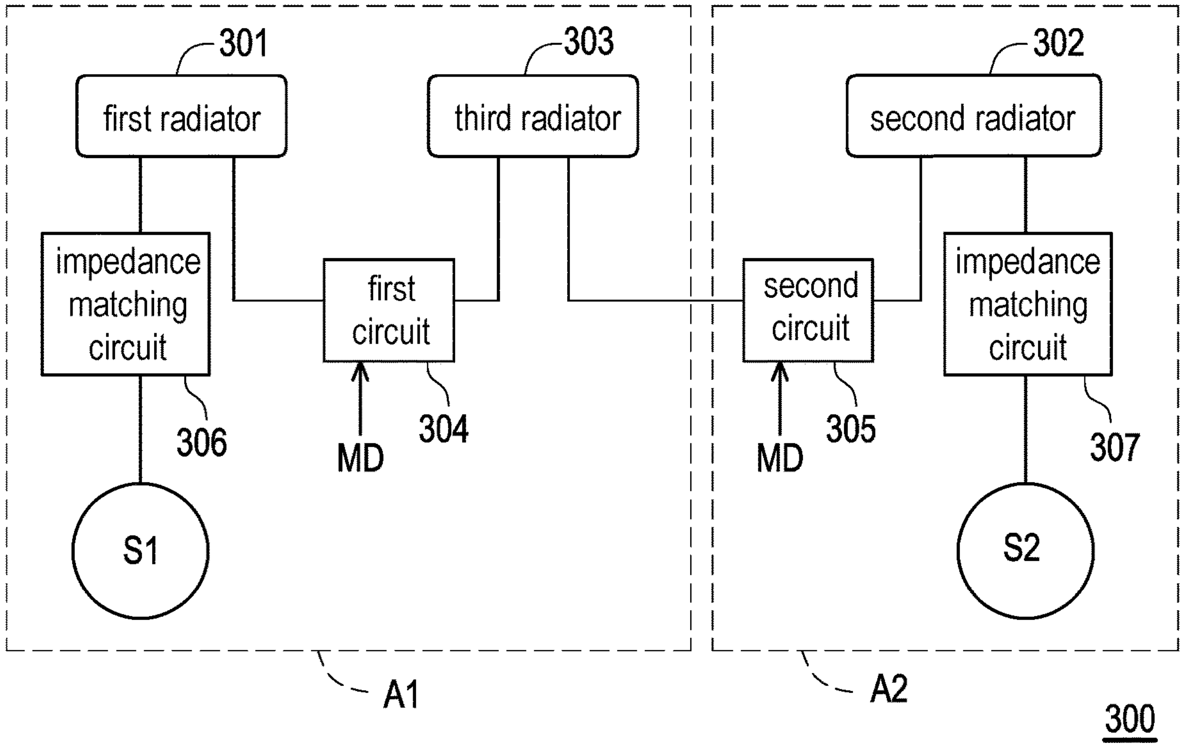
FIG. 3 is a schematic diagram illustrating a common mode implementation of the antenna structure of the present invention.

Referring to FIG. 3, FIG. 3 is a schematic diagram illustrating a common mode implementation of the antenna structure of the present invention. The antenna structure 300 includes a first signal source S1, a second signal source S2, a first radiator 301, a second radiator 302, a third radiator 303, a first circuit 304, a second circuit 305, and impedance matching circuits 306, 307. Wherein, the first circuit 304 is coupled between the first radiator 301 and the third radiator 303, and the second circuit 305 is coupled between the second radiator 302 and the third radiator 303. And the difference from the embodiment in FIG. 1 is that the impedance matching circuit 306 is coupled between the first radiator 301 and the first signal source S1 for performing impedance matching between the first radiator 301 and the first signal source S1; and the impedance matching circuit 307 is coupled between the second radiator 302 and the second signal source S2 for performing impedance matching between the second radiator 302 and the second signal source S2.

In the embodiment, in the common mode, according to the selection of the mode selecting signal MD, the first circuit 304 can conduct the connection between the first radiator 301 and the third radiator 303. In this way, the first wireless signal generated by the first signal source S1 can be transmitted to the first radiator 301, and the first wireless signal can be further provided to the third radiator 303 through the first circuit 304. On the other hand, the second circuit 305 turns off the connection between the second radiator 302 and the third radiator 303 according to the mode selecting signal MD, so that the second wireless signal generated by the second signal source S2 cannot be provided to the third radiator 303. By the selection of the above-mentioned mode selecting signal MD, the third radiator 303 and the first radiator 301 form the first sub-antenna structure A1 and can jointly receive the first wireless signal. The second wireless signal generated by the second signal source S2 is only provided to the second radiator 302. The second radiator 302 may form the second sub-antenna structure A2. The antenna structure 300 of the present invention can adjust the radiation pattern of the antenna structure 300 by sharing the first radiator 301 and the third radiator 303 in the first sub-antenna structure A1.

Figure 4:
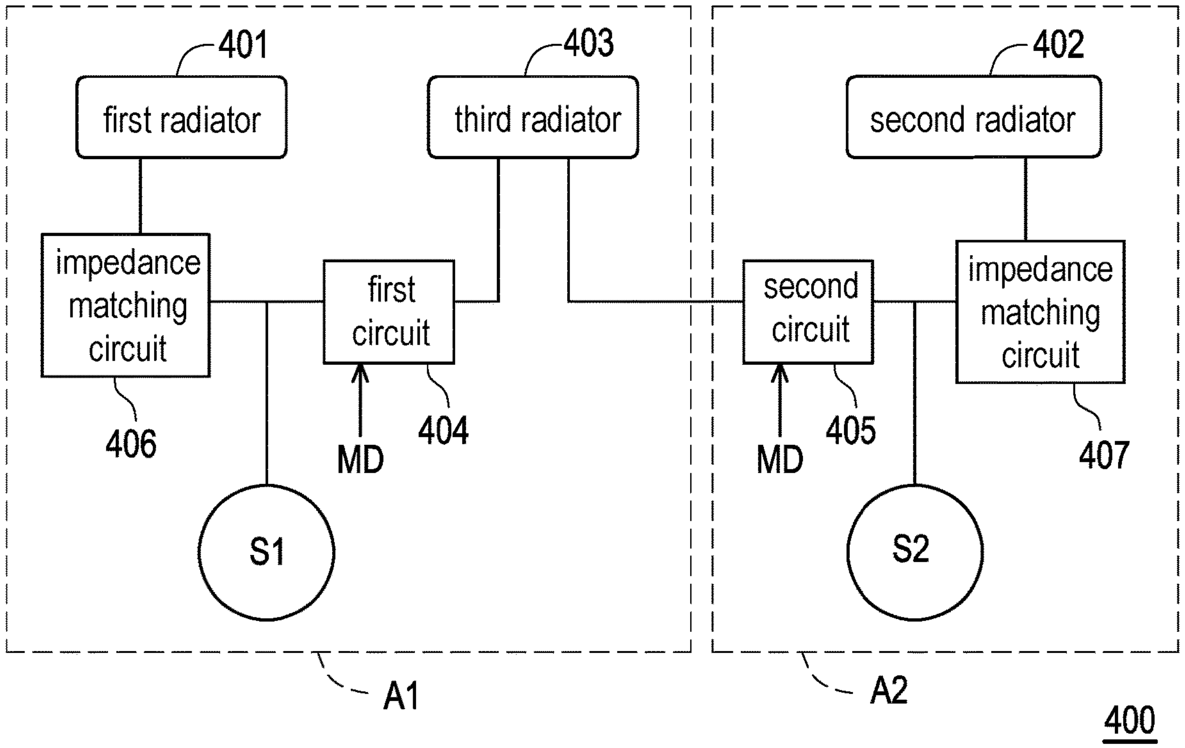
FIG. 4 is a schematic diagram illustrating another common mode implementation of the antenna structure of the present invention.

Referring to FIG. 4, FIG. 4 is a schematic diagram illustrating another common mode implementation of the antenna structure of the present invention. The antenna structure 400 includes a first signal source S1, a second signal source S2, a first radiator 401, a second radiator 402, a third radiator 403, a first circuit 404, a second circuit 405, and impedance matching circuits 406, 407. The difference from the embodiment in FIG. 3 is that the first circuit 404 is coupled between the first signal source S1 and the third radiator 403, and the second circuit 405 is coupled between the second signal source S2 and the third radiator 403.

In the embodiment, in the common mode, according to the selection of the mode selecting signal MD, the first circuit 404 conducts the connection between the first signal source S1 and the third radiator 403. In this way, the first wireless signal generated by the first signal source S1 can be transmitted to the first radiator 401, and the first wireless signal can be further provided to the third radiator 303 through the first circuit 404. On the other hand, the second circuit 405 turns off the connection between the second signal source S2 and the third radiator 403 according to the mode selecting signal MD, so that the second wireless signal generated by the second signal source S2 cannot be provided to the third radiator 403. By the selection of the above-mentioned mode selecting signal MD, the third radiator 403 and the first radiator 401 form the first sub-antenna structure A1 and can jointly receive the first wireless signal generated by the first signal source S1. The second wireless signal generated by the second signal source S2 is only provided to the second radiator 402. The second radiator 402 may form the second sub-antenna structure A2. The antenna structure 400 of the present invention can adjust the radiation pattern of the antenna structure 400 by sharing the first radiator 401 and the third radiator 403 in the first sub-antenna structure A1.

Figure 5:
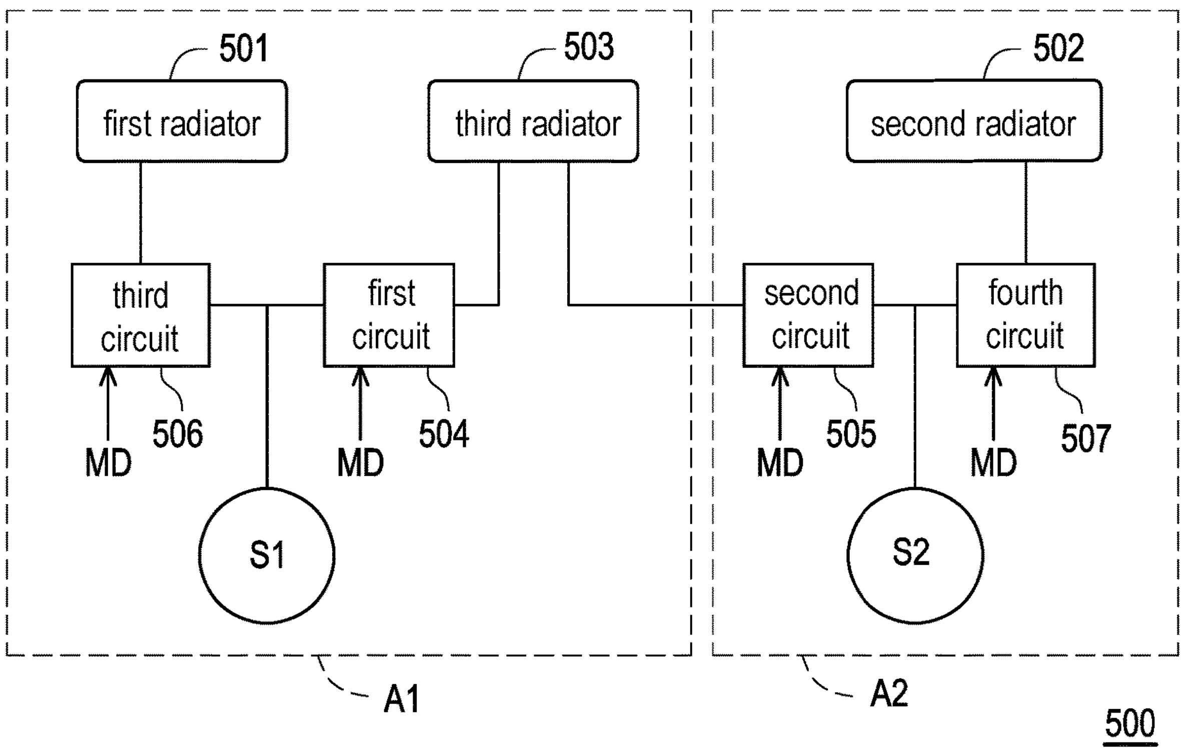
FIG. 5 is a schematic diagram illustrating an embodiment of the field pattern adjustment of the antenna structure of the present invention.

Referring to FIG. 5, FIG. 5 is a schematic diagram illustrating an embodiment of the field pattern adjustment of the antenna structure of the present invention. The antenna structure 500 includes a first signal source S1, a second signal source S2, a first radiator 501, a second radiator 502, a third radiator 503, a first circuit 504, a second circuit 505, a third circuit 506, and a fourth circuit 507. The difference from the embodiment in FIG. 4 is that the third circuit 506 is coupled between the first radiator 501 and the first signal source S1, and the fourth circuit 507 is coupled between the second radiator 502 and the first signal source S2. Wherein, the third circuit 506 and the fourth circuit 507 each have a switching function, and also have functions such as impedance matching and/or filtering. In the embodiment, the third circuit 506 and the fourth circuit 507 can be the same circuit structure as the first circuit 504 and the second circuit 505, and are the circuit structure illustrated in the circuit 200 in FIG. 2.

Wherein, the third circuit 506 can turn on or off the connection between the first radiator 501 and the first signal source S1 through the switch function. The fourth circuit 506 can turn on or off the connection between the second radiator 502 and the second signal source S2 through the switch function. The above-mentioned third circuit 506 and the fourth circuit 507 can perform the switching operation of the switch according to the mode selecting signal MD to determine whether the first radiator 501 receives the first wireless signal and also whether the second radiator 502 receives the second wireless signal so as to change the radiation pattern of the antenna structure 500.

In the embodiment, as shown in FIG. 5, according to the selection of the mode selecting signal MD, the first circuit 504 conducts the connection between the third radiator 503 and the first signal source S1; the second circuit 505 turns off the connection between the third radiator 503 and the second signal source S2; the third circuit 506 turns off the connection between the first radiator 501 and the first signal source S1; and the fourth circuit 507 conducts the connection between the second radiator 502 and the second signal source S2. By the selection of the above-mentioned mode selecting signal MD, the first wireless signal generated by the first signal source S1 is only provided to the third radiator 503. The third radiator 503 may form the first sub-antenna structure A1. The second wireless signal generated by the second signal source S2 is only provided to the second radiator 502. The second radiator 502 may form the second sub-antenna structure A2. The antenna structure 500 of the present invention can change the first sub-antenna structure A1 by using only the third radiator 503, thereby adjusting the radiation pattern of the antenna structure 500.

Figure 6A:
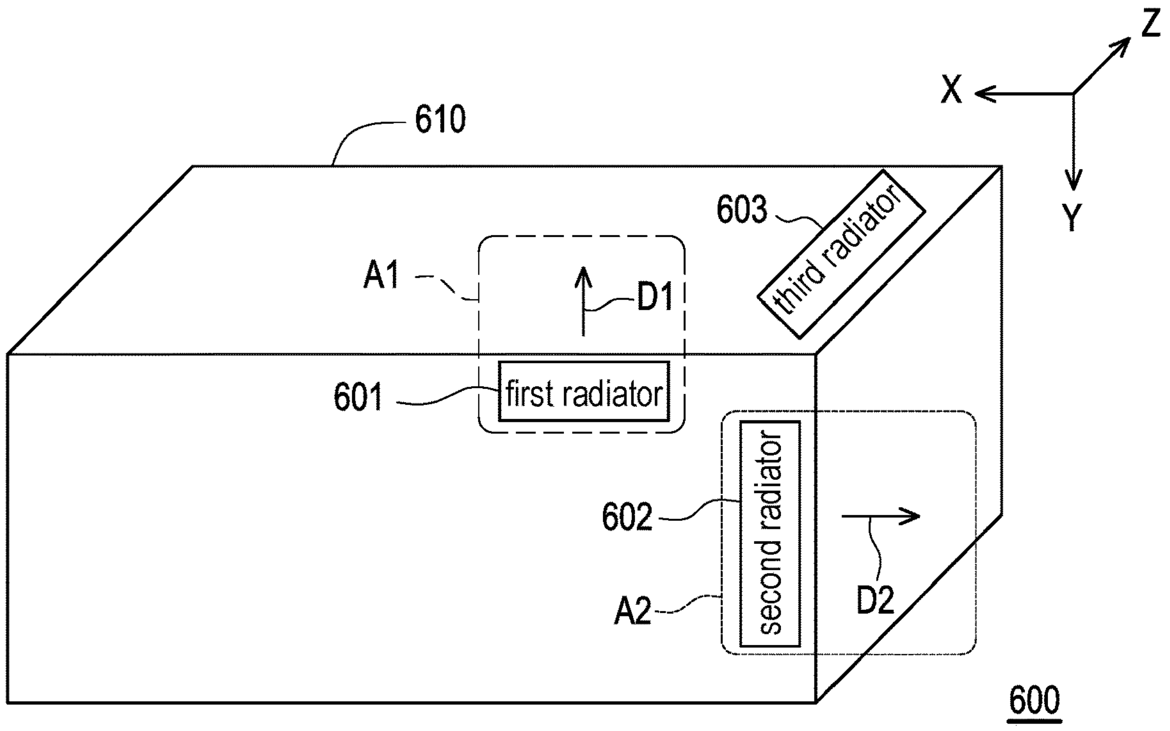
FIGS. 6A and 6B are schematic diagrams illustrating the configuration of an antenna structure disposed on an electronic device according to the embodiment of the present invention.
Figure 6B:
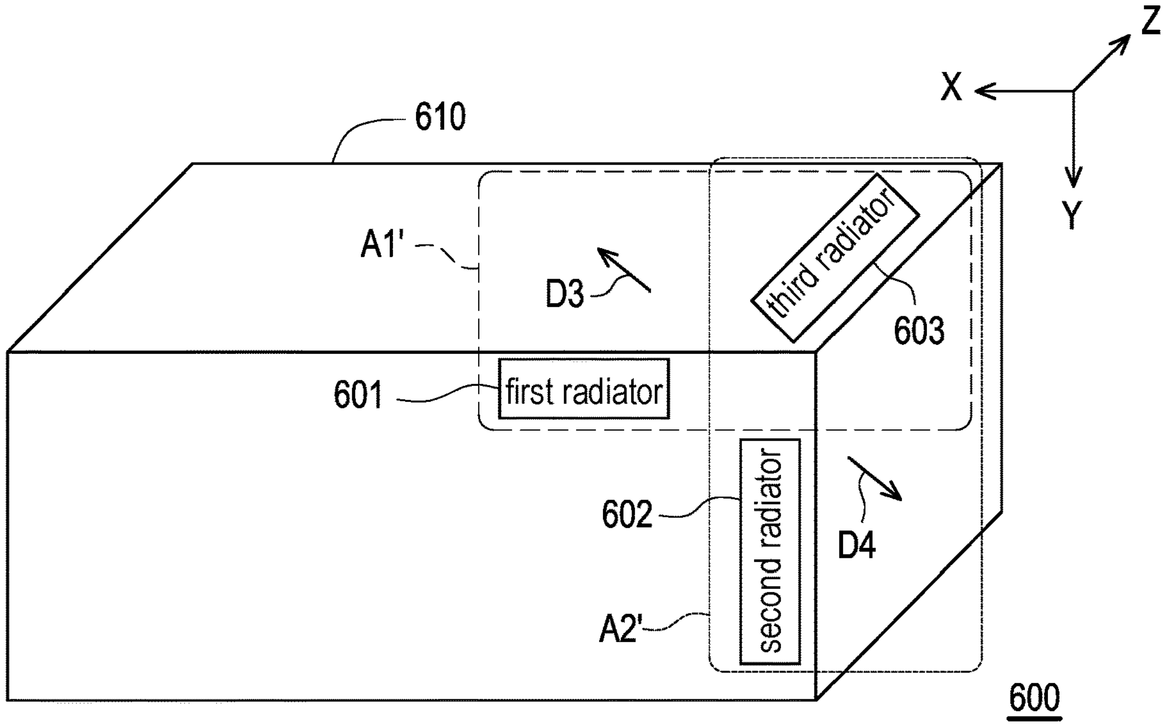

Referring FIGS. 6A and 6B. FIGS. 6A and 6B are schematic diagrams illustrating the configuration of an antenna structure disposed on an electronic device according to the embodiment of the present invention. The antenna structure 600 of FIGS. 6A and 6B may be any of the antenna structures of the embodiments of FIGS. 1, 3-5. In the embodiment of FIGS. 6A and 6B, the first radiator 601, the second radiator 602, and the third radiator 603 are disposed on the body portion 610 of an electronic device, wherein the first radiator 601, the second radiator 602, and the third radiator 603 are respectively arranged along the axis X, the axis Y, and the axis Z, and the axis X, Y, and Z are different. In the embodiment, the axial directions X, Y, and Z may be orthogonal to each other. The above setting manner is an example, and the present invention is not limited thereto.

In FIG. 6A, the antenna structure 600 can form a first sub-antenna structure A1 using only the first radiator 601 and a second sub-antenna structure A2 using only the second radiator 602 according to the mode selecting signal. As shown in FIG. 6A, when the first sub-antenna structure A1 transmits and receives signals, the main direction of the radiation pattern of the first sub-antenna structure A1 may be a direction D1. When the second sub-antenna structure A2 transmits and receives signals, the main direction of the radiation pattern of the second sub-antenna structure A2 may be a direction D2. Wherein, the first direction D1 is different from the second direction D2, and in the embodiment, the first direction D1 and the second direction may, for example, be orthogonal to each other.

In the embodiment of the first sub-antenna structure A1' in FIG. 6B, the antenna structure 600 forms the first sub-antenna structure A1' using the first radiator 601 and the third radiator 603 in common according to the mode selecting signal. The first sub-antenna structure A1' of FIG. 6B can be compared to the first sub-antenna structure A1 of FIG. 6A. The excitation energy of the first sub-antenna structure A1 only acts on the first radiator 601, so a radiation pattern whose main direction is the direction D1 excited by the first radiator 601. A part of the excitation energy of the first sub-antenna structure A1' acts on the first radiator 601, and another part of the excitation energy acts on the third radiator 603. Since the first sub-antenna structure A1' is co-excited by the first radiator 601 and the third radiator 603 arranged in different axial directions, the main direction of the radiation pattern is shifted from the direction D1 to the direction D3.

In the embodiment of the second sub-antenna structure A2' in FIG. 6B, the antenna structure 600 forms a second sub-antenna structure A2' using the second radiator 602 and the third radiator 603 together according to the mode selecting signal. Likewise, the second sub-antenna structure A2' of FIG. 6B can be compared with the second sub-antenna structure A2 of FIG. 6A. Since the second sub-antenna structure A2' is co-excited by the second radiators 602 and the third radiators 603 arranged in different axial directions, the main direction of the radiation pattern is shifted from the direction D2 to the direction D4.

It is worth mentioning that, in the embodiment, the first to third radiators 601-603 can be arranged along the axis X, Y, and Z, respectively. The axial directions X, Y, and Z are different. In this embodiment, the axial directions X, Y, and Z may be orthogonal to each other. Therefore, taking the first sub-antenna structure A1' and the second sub-antenna structure A2' as an example, the antenna structures A1', A2' can shift the radiation direction by the mutual action of the mutually orthogonal radiators, so as to achieve the best field pattern adjustment. In the embodiment, taking the first sub-antenna structure A1' as an example, the adjustment of the direction of the transmitted signal of the first sub-antenna structure A1' can be performed by adjusting the excitation energy intensity of at least one of the two mutually orthogonal radiators in the first sub-antenna structure A1'.

Figure 7A:
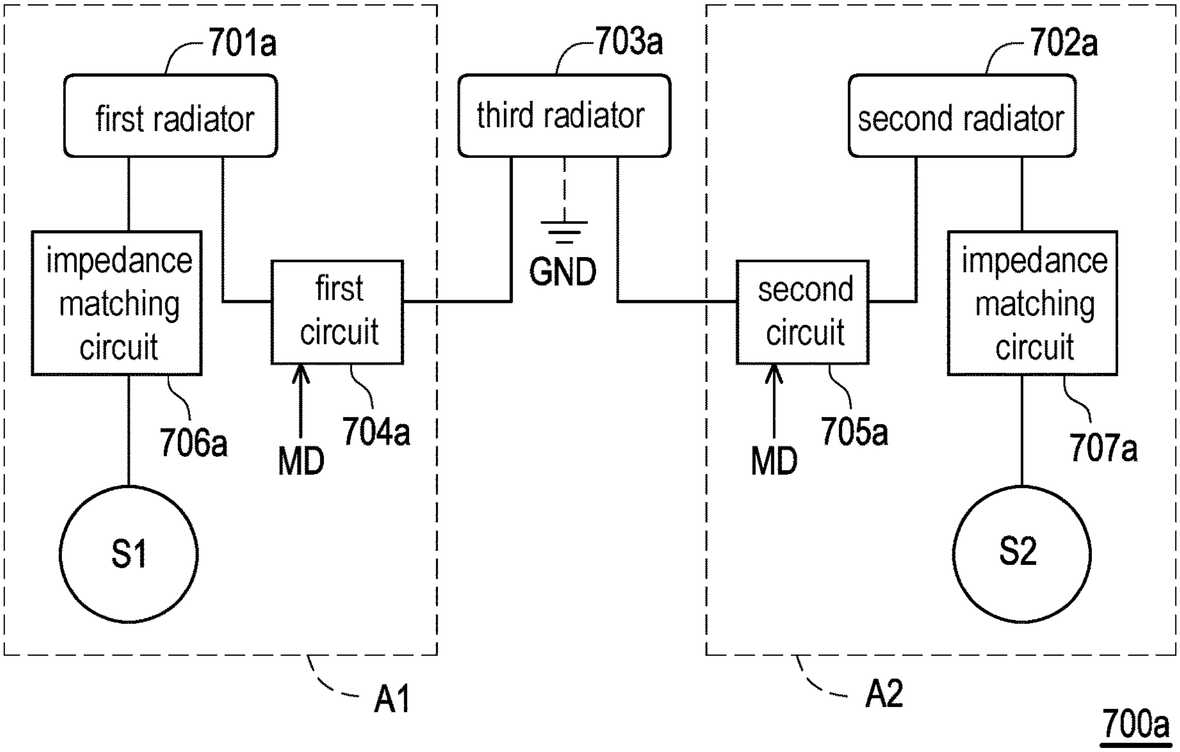
FIGS. 7A and 7B are schematic diagrams illustrating an embodiment of the antenna structure of the present invention for increasing the antenna isolation.
Figure 7B:
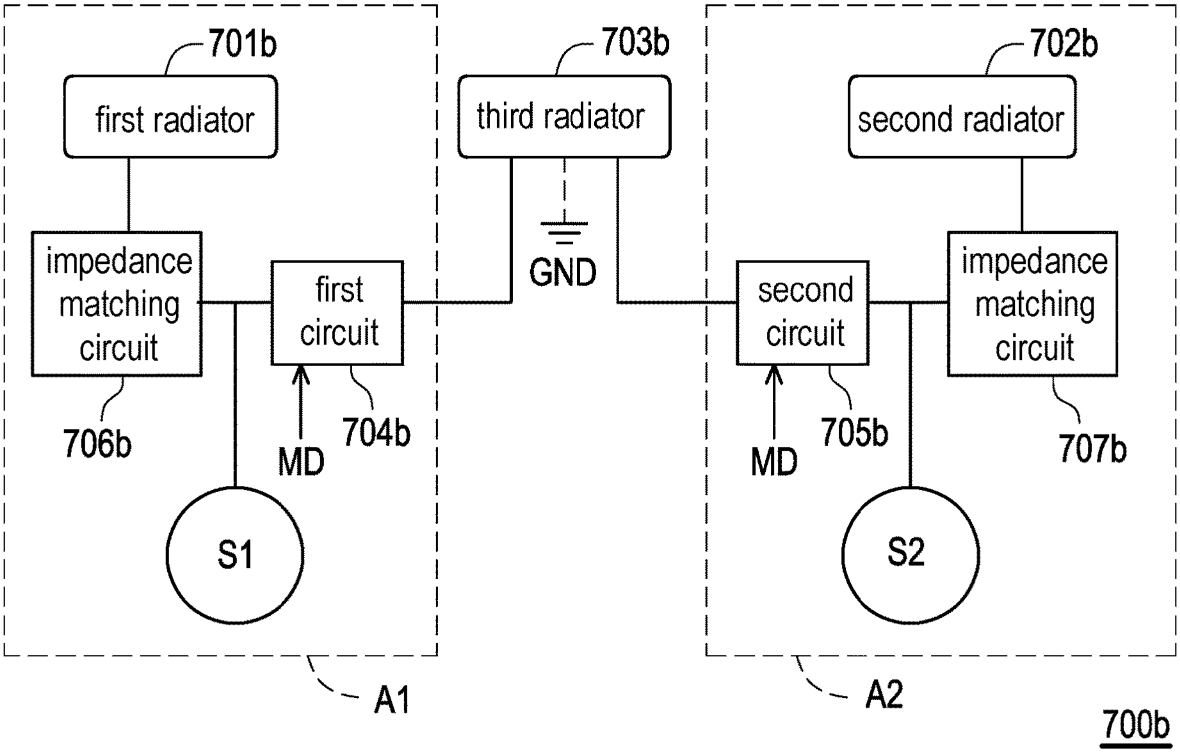

Referring to FIGS. 7A and 7B. FIGS. 7A and 7B are schematic diagrams illustrating an embodiment of the antenna structure of the present invention for increasing the antenna isolation. The antenna structure 700*a* of FIG. 7A includes a first signal source S1, a second signal source S2, a first radiator 701*a*, a second radiator 702*a*, a third radiator 703*a*, a first circuit 704*a*, a second circuit 705*a*, and impedance matching circuits 706*a*, 707*a*. The antenna structure 700*b* of FIG. 7B includes a first signal source S1, a second signal source S2, a first radiator 701*a*, a second radiator 702*a*, a third radiator 703*a*, a first circuit 704*a*, a second circuit 705*a*, and impedance matching circuits 706*b*, 707*b*.

The difference between the embodiment of FIG. 7A and the embodiment of FIG. 3 is that, in the antenna structure 700*a*, one end of the third radiator 703*a* can be coupled to the reference ground terminal GND. Wherein, the terminal of the third radiator 703*a* coupled to the reference ground terminal GND may have the same or different distances from the terminal coupled to the first circuit 704*a* and the second circuit 705*a*, respectively. According to the selection of the mode selecting signal MD, the first circuit 704*a* can turn off the connection between the third radiator 703*a* and the first radiator 701*a*; the second circuit 705*a* can turn off the connection between the third radiator 703*a* and the second radiator 702*a*. Therefore, in the antenna structure 700*a*, the first radiator 701*a* receives the first wireless signal to form the first sub-antenna structure A1; the second radiator 702*a* receives the second wireless signal to form the second sub-antenna structure A2. The third radiator 703*a* is disposed between the first radiator 701*a* and the second radiator 702*a* and is coupled to the reference ground terminal GND to increase the isolation between the first sub-antenna structure A1 and the second sub-antenna structure A2. In some embodiments of the present invention, the third radiator 703*a* can also choose not to be coupled to the reference ground terminal GND, and use the structure of the third radiator 703*a* itself. Thereby, the isolation between the first sub-antenna structure A1 and the second sub-antenna structure A2 can also be increased.

Similarly, the difference between the embodiment of FIG. 7B and the embodiment of FIG. 4 is that, in the antenna structure 700*b*, one end of the third radiator 703*b* may be coupled to the reference ground terminal GND. Wherein, the distance between the end of the third radiator 703*b* coupled to the reference ground terminal GND and the end of the third radiator 703*b* coupled to the first circuit 704*b* and the end of the second circuit 705*b* may be the same or different. According to the selection of the mode selecting signal MD, the first circuit 704*b* can turn off the connection between the third radiator 703*b* and the first signal source S1; the second circuit 705*b* can turn off the connection between the third radiator 703*b* and the second signal source S2. Therefore, in the antenna structure 700*b*, the first radiator 701*b* receives the first wireless signal to form the first sub-antenna structure A1; the second radiator 702*b* receives the second wireless signal to form the second sub-antenna structure A2. The third radiator 703*b* is disposed between the first radiator 701*b* and the second radiator 702*b* and is coupled to the reference ground terminal GND to increase the isolation between the first sub-antenna structure A1 and the second sub-antenna structure A2. In some embodiments of the present invention, the third radiator 703*b* can also choose not to be coupled to the reference ground terminal GND, and use the structure of the third radiator 703*b* itself. Thereby, the isolation between the first sub-antenna structure A1 and the second sub-antenna structure A2 can also be increased.

It is worth mentioning that, in some embodiments, the third radiators 703*a* and 703*b* of FIGS. 7A and 7B can also be formed by extending structures of the main ground plane on the electronic device provided by the antenna structures 700*a* and 700*b*, so as to increase the isolation between the first sub-antenna structure A1 and the second sub-antenna structure A2.

Figure 8A:
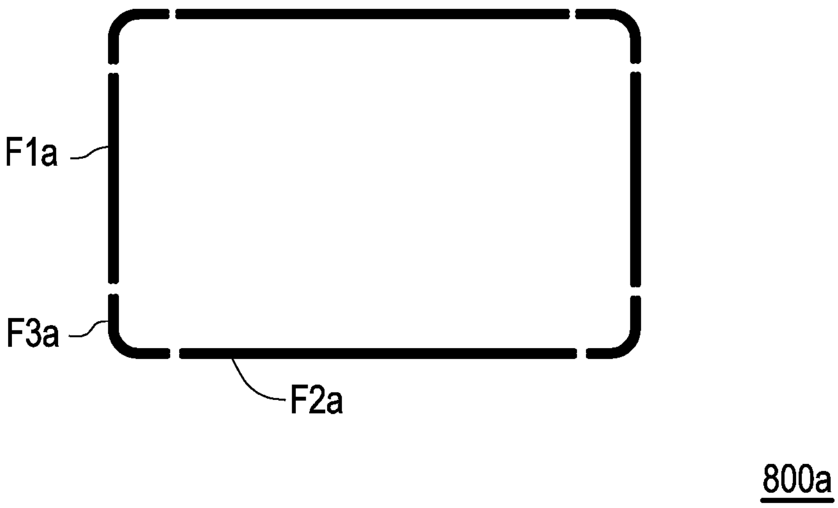
FIGS. 8A and 8B are schematic diagrams illustrating embodiments of the antenna configuration of the present invention.
Figure 8B:
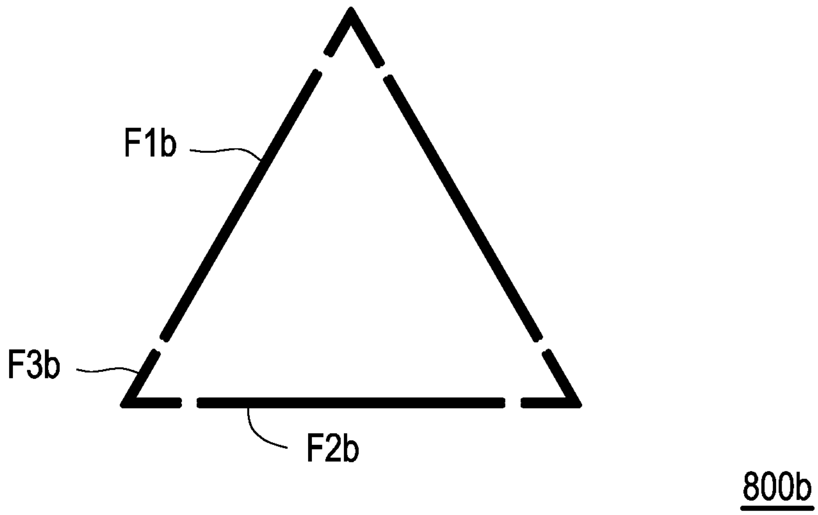

In various embodiments of the present invention, the first radiator to the third radiator of the present invention may be disposed on the electronic device in various ways. In some embodiments of the present invention, the first to third radiators of the present invention may be part of a metal casing of an electronic device. Referring to FIGS. 8A and 8B. FIGS. 8A and 8B are schematic diagrams of embodiments of certain antenna configurations of the present invention. In FIG. 8A, the metal casing 800*a* is in the shape of a rectangular which has a corner portion F3*a*, a first extension portion Fla adjacent to the first side of the corner portion F3*a*, and a second extension portion F2*a* adjacent to the second side of the corner portion F3*a*. In an embodiment of the present invention, the corner portion F3*a* may be configured as the third radiator of the present invention, the first extension portion Fla may be configured as the first radiator of the present invention, and the second extension portion F2*a* may be configured as the second radiator of the present invention. In other embodiments of the present invention, the configuration relationship between the corner portion F3*a*, the first extension portion Fla, and the second extension portion F2*a* and the first radiator to the third radiator of the present invention may be any other arrangement and combination. In addition, the metal casing of the present invention is not limited to a rectangular shape, but may be an arbitrary polygon. Taking FIG. 8B as an example, the metal casing 800*b* is in the shape of a triangle, which has a corner portion F3*b*, a first extension portion F1*b* adjacent to the first side of the corner portion F3*b*, and a second extension portion F2*b* adjacent to the second side of the corner portion F3*b*.

To sum up, the antenna structure of the present invention can be configured in an electronic device, and according to the selection of the mode selecting signal, the radiation pattern of the antenna structure can be adjusted and/or the isolation of the antenna structure can be increased to achieve the best communication quality.

What is claimed is:

1. An antenna structure, comprising:
- a first signal source, used to generate a first wireless signal;
- a second signal source, used to generate a second wireless signal;
- a first radiator, coupled to the first signal source to receive the first wireless signal;
- a second radiator, coupled to the second signal source to receive the second wireless signal;
- a third radiator;
- a first circuit, having a first end coupled to the third radiator and a second end coupled to the first radiator or the first signal source;
- a second circuit, having a first end coupled to the third radiator and a second coupled to the second radiator or the second signal source,
- wherein when the second end of the first circuit is coupled to the first signal source, the first circuit turns on or off a connection path between the third radiator and the first signal source according to a mode selecting signal;
- a third circuit, coupled between the first signal source and the first radiator; and a fourth circuit, coupled between the second signal source and the second radiator, wherein the third circuit turns on or off a connection path between the first signal source and the first radiator according to the mode selecting signal.

2. The antenna structure according to claim 1, wherein a first end of the third radiator is coupled to the first circuit, a second end of the third radiator is coupled to the second circuit, and a third end of the third radiator is coupled to a reference ground terminal.

3. The antenna structure according to claim 2, wherein the first circuit turns off the connection between the third radiator and the first radiator and the first signal source according to a mode selecting signal, and the second circuit turns off the connection between the third radiator, the second radiator and the second signal source according to the mode selecting signal.

4. The antenna structure according to claim 2, wherein the antenna structure is arranged on an electronic device, and the third radiator is formed by an extension structure of a main ground plane of the electronic device.

5. The antenna structure according to claim 2, wherein the first radiator is further coupled to a reference ground terminal; and the second radiator is further coupled to a reference ground terminal.

6. The antenna structure according to claim 1, wherein each of the third circuit and the fourth circuit includes an impedance matching circuit, a switch circuit, and a filter circuit coupled in series with each other.

* * * * *